(12) United States Patent
Beals et al.

(10) Patent No.: US 10,576,541 B2
(45) Date of Patent: *Mar. 3, 2020

(54) STRUCTURED POWDER PARTICLES FOR FEEDSTOCK IMPROVEMENT FOR LASER BASED ADDITIVE MANUFACTURING

(71) Applicant: UNITED TECHNOLOGIES CORPORATION, Farmington, CT (US)

(72) Inventors: James T Beals, West Hartford, CT (US); Ying She, East Hartford, CT (US); Vijay Jagdale, Manchester, CT (US); John A Sharon, Manchester, CT (US)

(73) Assignee: United Technologies Corporation, Farmington, CT (US)

( * ) Notice: Subject to any disclaimer, the term of this patent is extended or adjusted under 35 U.S.C. 154(b) by 621 days.

This patent is subject to a terminal disclaimer.

(21) Appl. No.: 15/189,244

(22) Filed: Jun. 22, 2016

(65) Prior Publication Data

US 2017/0368603 A1  Dec. 28, 2017

(51) Int. Cl.
*B22F 3/10* (2006.01)
*B22F 1/02* (2006.01)
(Continued)

(52) U.S. Cl.
CPC ............... *B22F 1/025* (2013.01); *B22F 9/22* (2013.01); *B23K 26/342* (2015.10); *B33Y 10/00* (2014.12); *B33Y 70/00* (2014.12); *C22C 1/0416* (2013.01); *C22C 1/0425* (2013.01); *B22F 1/02* (2013.01); *B22F 3/1055* (2013.01);
(Continued)

(58) Field of Classification Search
None
See application file for complete search history.

(56) References Cited

U.S. PATENT DOCUMENTS

| 6,254,928 B1 * | 7/2001 | Doan | B01J 2/003 |
| | | | 204/157.41 |
| 10,005,127 B2 * | 6/2018 | Dardas | B33Y 10/00 |

(Continued)

FOREIGN PATENT DOCUMENTS

| JP | 2010/258344 A | * | 11/2010 |
| WO | 2015036802 A2 | | 3/2015 |
| WO | 2015112365 A1 | | 7/2015 |

OTHER PUBLICATIONS

Translation of JP 2010-258344 (published Nov. 11, 2010) obtained form J-Plat Pat.*

(Continued)

*Primary Examiner* — George Wyszomierski
(74) *Attorney, Agent, or Firm* — Bachman & LaPointe, P.C.

(57) ABSTRACT

A process comprising providing a metallic first powder having a plurality of first particles. The process includes adding a second material to the first powder, the second material having a plurality of second particles. The process includes combining the first powder with the second material to form a modified powder including modified powder particles having an interior portion containing an interior composition, and an outer surface portion with an outer composition different from the interior composition.

3 Claims, 3 Drawing Sheets

(51) Int. Cl.
*B33Y 70/00* (2020.01)
*B22F 9/22* (2006.01)
*B33Y 10/00* (2015.01)
*B23K 26/342* (2014.01)
*C22C 1/04* (2006.01)
*B22F 3/105* (2006.01)

(52) U.S. Cl.
CPC ... *B22F 2003/1056* (2013.01); *B22F 2201/01* (2013.01); *B22F 2201/10* (2013.01); *B22F 2201/40* (2013.01); *B22F 2301/052* (2013.01); *B22F 2998/10* (2013.01)

(56) References Cited

U.S. PATENT DOCUMENTS

| | | |
|---|---|---|
| 2007/0207266 A1 | 9/2007 | Lemke |
| 2013/0302675 A1* | 11/2013 | Kouzu ............... H01M 4/364 429/211 |
| 2015/0321253 A1 | 11/2015 | Espinal et al. |
| 2015/0332850 A1* | 11/2015 | Nishio ................ H01F 1/24 336/221 |
| 2016/0279703 A1 | 9/2016 | Clare et al. |
| 2016/0339521 A1 | 11/2016 | Dardas et al. |

OTHER PUBLICATIONS

European Search Report dated Nov. 16, 2017 for European Patent Application No. 17177107.4.

* cited by examiner

STRUCTURED POWDER PARTICLES FOR FEEDSTOCK IMPROVEMENT FOR LASER BASED ADDITIVE MANUFACTURING

BACKGROUND

The present disclosure is directed to the improving laser based additive manufacturing through the use of structured powder particles as feedstock.

Laser based additive manufacturing methods can create near net shape components by selectively melting powder particles in a layer by layer fashion. The processing and resultant quality of the deposit is sensitive the powder feedstock which depending on the alloy in question can be subject to one or more of 3 main challenges.

One challenge is flammability. Most metals in powder form have ignition/explosion dangers requiring careful powder handling and costly safety/fire suppression systems.

Another challenge includes contamination. Certain alloys have a higher propensity to pick up moisture and other deleterious compounds from the atmosphere. When the powder is then rapidly melted and solidified in the additive process, the contaminants can evolve creating detrimental gas bubbles/blisters/pores in the build. While it is possible to keep powder sealed in an inert container prior to use, exposure to atmosphere occurs at the end of the build when the additive system is opened to extract the part and recapture unused powder for subsequent builds.

Another challenge is reflectivity. Some alloys have a high reflectivity causing much of the incident energy from the laser to be reflected. The consequence is that the additive system must run at either higher powers or slower speeds thus degrading the build efficiency.

Processes that remove surface moisture and contaminants from metal powders have been utilized. The desire to produce parts from feedstock by additive manufacturing processes having tailored structures with acceptable properties remains.

SUMMARY

In accordance with the present disclosure, there is provided a process comprising: providing a metallic first powder having a plurality of first particles; adding a second material to the first powder, the second material having a plurality of second particles; combining the first powder with the second material to form a modified powder including modified powder particles having an interior portion containing an interior composition, and an outer surface portion with an outer composition different from the interior composition.

In another and alternative embodiment, the outer surface portion includes properties selected from the group consisting of low flammability, low reflectivity, low melting point and low moisture/contamination pick up.

In another and alternative embodiment, the low reflectivity outer surface portion is selected from the group consisting of Mg, W, Fe, Mo, Cr, and Si.

In another and alternative embodiment, the low flammability outer surface portion is selected from the group consisting of Zr, Ti, Si, Cr, Mn, Sn, Zn, Pb, Mo, Co, W, Cu, and Ni.

In another and alternative embodiment, the outer surface portion comprises a continuous coating.

In another and alternative embodiment, the outer surface portion comprises a discontinuous coating.

In another and alternative embodiment, the process further comprises forming an additional layer, the additional layer having a composition different from the interior composition In another and alternative embodiment, the internal portion composition is selected from the group consisting of a major constituent of an end alloy.

In accordance with the present disclosure, there is provided a modified powder composition comprising an interior portion containing an interior composition; and an outer surface portion with an outer composition different from the interior composition coupled to the interior portion, wherein the outer surface portion includes properties selected from the group consisting of low flammability, low reflectivity, low melting point and low moisture/contamination pick up.

In another and alternative embodiment, the process further comprises melting the modified powder during an additive build, dissolving the outer composition into a melt pool; mixing the outer composition into the interior composition.

In another and alternative embodiment, the low flammability outer surface portion is selected from the group consisting of Zr, Ti, Si, Cr, Mn, Sn, Zn, Pb, Mo, Co, W, Cu, and Ni.

In another and alternative embodiment, the modified powder composition further comprises an additional layer, the additional layer having a composition different from the interior composition.

In another and alternative embodiment, the interior portion composition is selected from the group consisting of a major constituent of an end alloy.

In another and alternative embodiment, the outer surface portion comprises a continuous coating or a discontinuous coating.

In another and alternative embodiment, the low reflectivity outer surface portion is selected from the group consisting of Mg, W, Fe, Mo, Cr, and Si.

Other details of the structured powder particles for feedstock improvement of laser based additive manufacturing are set forth in the following detailed description and the accompanying drawing wherein like reference numerals depict like elements.

DETAILED DESCRIPTION

Figure 1:
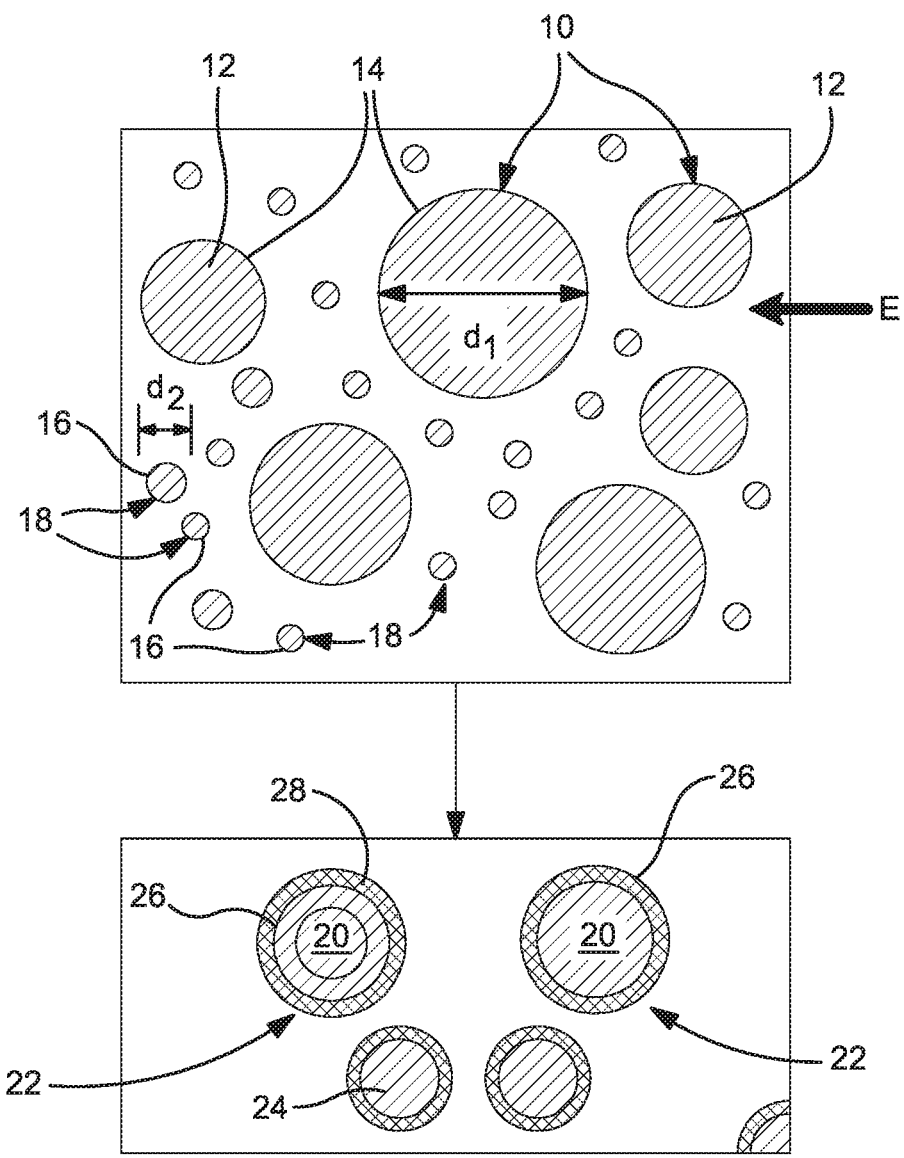
FIG. 1 illustrates the modification of a powder feedstock.

FIG. 1 shows provided first particles 12 of metallic first powder material 10, and second particles, or precursor 16 of a second material 18.

Particles 12 of first powder material 10 are generally intended for use, for example in an additive manufacturing process to form a feedstock, or can be applied by additive manufacturing to form a coating for a bulk material. However, the bulk properties of first powder material 10 formed from first particles 12 are generally limited by the bulk composition. For example the first powder material 10 may have properties that limit the effectiveness and present challenges, such as possessing ignition/explosion dangers requiring careful powder handling and costly safety/fire suppression systems; a higher propensity to pick up moisture and other deleterious compounds from the atmosphere; a high reflectivity causing much of the incident energy from the laser to be reflected and the like. Thus it would be helpful to improve certain surface properties of first particles 12 without substituting or changing the composition (and resulting properties) of the feedstock.

To alter outer surface properties of the first particles 12, second particles 16 of the second material 18 can be introduced in various process environments. The second material 18 can, for example, be a second composition (or a precursor thereof) which can operate as an outer layer or surface layer for particles 12 prior to or during consolidation. An additional material can be added as an additional coating/third layer 28. The internal portion 20 material can be less costly than the other materials.

In certain embodiments, the first powder material 10 can be combined with the second material 18 such that modified particles 24 of modified powder 22 can include parts of first particles 12 of metallic first powder 10 coated with outer layer 26. Outer layer 26 can be either second material 18, or a new altered or alloyed composition. The second particles 16 after coating over the first powder material 10 will thus generally introduce a particular property to the outside of the modified particles 24, which have improved processing and handling of as compared to first particles 12 during a bulk manufacturing or consolidation process. In certain embodiments, second material 18 can be a ceramic composition or an alloying composition (or a precursor thereof), which is broken down during other steps of the process. Examples of such approaches will be discussed in turn.

Figure 2:
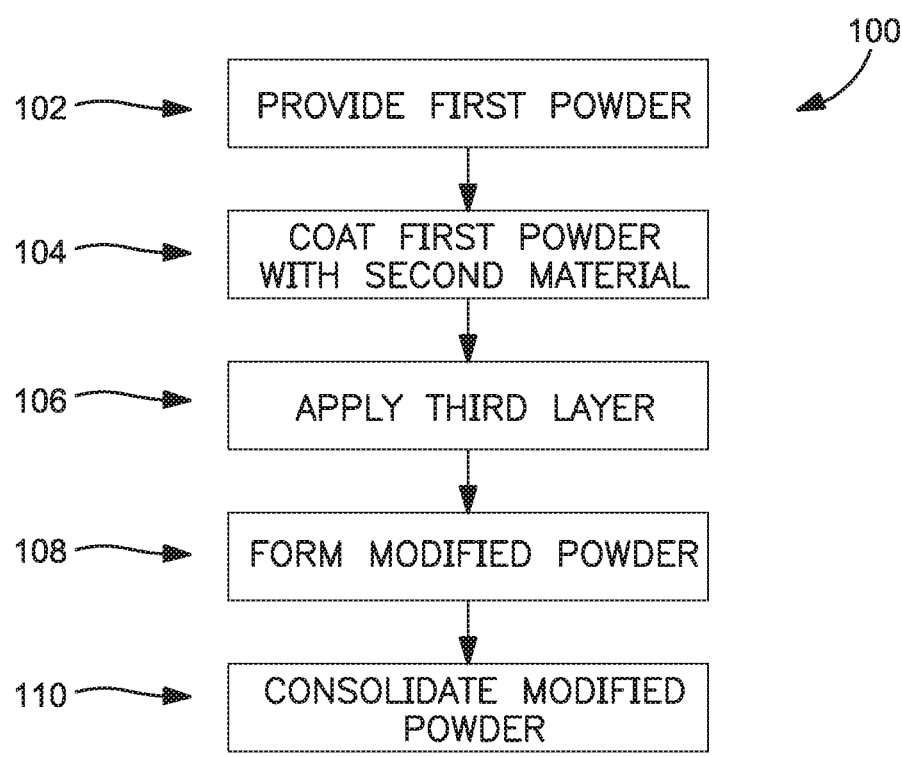
FIG. 2 is an exemplary process chart for tailoring the structure of the powder feedstock as illustrated in FIG. 1.

FIG. 2 shows a process diagram of an exemplary method for making a feedstock from a metallic powder. Certain steps of method 100 are illustrated in FIG. 1. Method 100 includes step 102 in which the first particles of a first powder are placed in a reactor, followed by step 104, where the second particles/precursor of the second material are coated on the first powder. In certain embodiments, the second particles are actually precursor compositions, and break down into an alloying element or a protective composition upon the application of sufficient energy.

At step 106, by repeating step 104, an additional layer, i.e., third layer can be applied over the outer layer. The additional layer/third layer can have the material properties desired for the outer layer.

Next, in step 108, the first powder and the second material can be combined to form a modified powder. As briefly described with respect to FIG. 1, there are two general ways that the second particles can modify surface properties of the first particles. First, upon contact, some of the second material can be alloyed with outer surfaces of the first powder particles. The composition of the outer surface layer contains an alloy of the first powder and at least one constituent of the second material. Alternatively, the second particles solidify about perimeters 14 of the first particles to form its own outer surface layer on the modified particles, while substantially maintaining the same composition on the interior portion of the modified particle. Whether the second material forms an alloy or a separate outer surface layer on particles of the first powder will depend on the choice of materials and the relative phase relationships and system energy. This step can be repeated to create a feedstock of modified particles having a central core and an outer layer, and/or a third layer.

For the purpose of describing the present disclosure, the metallic material is detailed hereinafter as being an aluminum alloy powder. The present disclosure provides particular utility regarding the processing of aluminum alloy particles 12 (e.g., because of the reflectivity of aluminum alloy powders), but the applicability of the present disclosure is not limited to aluminum alloys. The term "powder" as used herein refers to matter configured in the form of fine discrete particles.

In an exemplary embodiment, the first powder can be a metallic material (or precursor) selected from a group consisting of: nickel, titanium, chromium, aluminum, and alloys thereof.

The second material can include at least a second metallic material, or metal precursor(s). In the case where the second material is metallic, the second material (or resulting composition) will typically include at least one alloying element compatible with the composition making up the outer portion of the first particles. This combination provides a surface alloy which can help facilitate deposition and/or bonding of the first powder as a bulk material, while ensuring that many of the resulting bulk material properties are maintained based on the substantially identical interior portion of the modified particles. To further minimize effects on the bulk material, the alloying element can be selected to be inert to one or more properties of the bulk material in small concentrations. In another example, the second powder can include a ceramic material (or precursor). Non-limiting examples include boron nitride, silicon carbide, silicon nitride and combinations thereof. In this case, the ceramic (or precursor) generally does not directly interact with the composition of the first powder, and instead results in a protective coating disposed about the metallic first particles.

The particles 12 may assume a variety of different particle sizes; e.g., particles having a diameter in the range of about one micrometer to one hundred and fifty micrometers (i.e., 1-150 μm). The present disclosure is typically used to process particles 12 of a given size (i.e., substantially all of the particles are "d" diameter) during a particular processing application, but the present disclosure is not limited to processing particles 12 of a specific size.

Non-limiting examples of aluminum alloy powders that may be processed using the present disclosure include aluminum 5056, aluminum 6061, aluminum 7075, PAN-DALLOY aluminum alloy, and the like.

For example, the nickel alloy can include IN 718 at the internal portion and, for example, having B, Si, and P at the surface/outer layer to locally lower melting point and increase throughput.

The resultant feedstock/bulk material can result in aluminum alloy the internal portion, such as AA6061, having an outer layer comprising 1.0Mg-0.6Si—0.3Cu-0.2Cr and Si, and an additional central core material comprising Mg, which is the major constituent of the end alloy after additive manufacturing processing.

Another exemplary aluminum alloy feedstock can include the aluminum alloy at the internal portion such as AA7075, with a central core material comprising 5.6Zn-2.5Mg-1.6Cu-0.23Cr-Balance Al and Zn on the inside of the aluminum alloy at the central core, and Cr on the exterior/outer layer.

Another exemplary copper alloy feedstock can include a cooper alloy having at the internal portion C61300 (Aluminum bronze) 90Cu-7A1-2.7Fe-0.3Sn and place Fe on the outer layer.

Another exemplary copper alloy feedstock can include a copper alloy having C70400, 92.4Cu-5.5Ni-1.5Fe-0.6Mn and place the Ni and Fe on the outer layer.

Another exemplary copper alloy feedstock can include a copper alloy having C72200 (Cupronickel with Cr), 83Cu-16.5Ni-0.5Cr and place the Ni on the outer layer.

In alternative embodiments, certain materials can be utilized at the outer layer to suppress flammability. A short list of elements High to Low flammability, can be selected from the group consisting of Zr, Ti, Si, Cr, Mn, Sn, Zn, Pb, Mo, Co, W, Cu, and Ni.

In alternative embodiments, certain materials can be utilized at the outer layer to reduce reflectivity. A short list of elements from high to low reflectivity can be selected from the group consisting of Mg, W, Fe, Mo, Cr, and Si.

In an exemplary embodiment, a system (not shown) operable to prepare the first material for further processing; e.g., additive manufacturing can include a fluidized bed reactor, at least one working gas source, at least one precursor gas source, a mass flow control device, an escaped powder collector vessel, a liquid (e.g., water) bubbler, and various valves and flow measuring devices (e.g., pressure gauges, temperature sensing devices, etc.) disposed within piping connecting the aforesaid devices. The piping may include bleed line, outlet lines, vents, etc. In addition, a processor may be included in the system in communication with one or more of the aforesaid devices, valves, and flow measuring devices to control and monitor the system. The aforesaid system is an example of a system configuration, and the present disclosure is not limited to this system. The fluidized bed reactor may assume a variety of different configurations.

The working gas source can be at least one gas that is inert and/or one that creates a "reducing atmospheric environment" with respect to the processing of the particular material.

The second particle/precursor 16 can be provided by a gas source that provides one or more gases that include at least one material 18 that coats the powder particles 12 during processing. The material(s) 18 from the precursor 16 gas(es) that coats the powder particles 12 is one that, when applied in sufficient coating thickness, results in the coated powder particles 12 having a variety of characteristics and material properties, such as, for example a level of reflectivity that is acceptable for subsequent processing of the coated particles 12 within an additive manufacturing process. The specific thickness of the coating on the particles 12 may vary depending on factors such as the coating material, the material of the powder particle, the additive manufacturing process for which the power particles are being prepared for, etc. The present disclosure is not limited to any particular coating thickness.

In some embodiments, the present disclosure may utilize an additional source of one or more additional materials/precursor gases (hereinafter referred to collectively as a source of a "second precursor gas"), each of which can be used to coat the particles 12 of the particular powder material with the third layer 28.

After forming the modified particles (step 108), step 110 includes consolidating the modified particles (i.e., a combined first powder and second powder) to form at least part of a bulk material feedstock.

In one instance, step 110 includes consolidating the modified particles via an additive manufacturing apparatus. Generally, the modified particles can be disposed onto a working surface of the additive manufacturing apparatus. For example, the modified particles can be formed separately, and prior to their introduction to the apparatus. Alternatively, combining step 108 can be done at or immediately prior to the time of their introduction onto the working surface in step 110. An illustrative example of this process is shown with respect to FIG. 3.

Structuring powder particles such that one constituent of the alloy predominantly resides on the outer layers/surface can be facilitated by several techniques that include but are not limited to: atomic layer deposition (ALD), physical vapor deposition (PVD) to include evaporation, sputtering, pulsed laser deposition, etc., and chemical vapor deposition (CVD), and electro-less plating.

Figure 3:
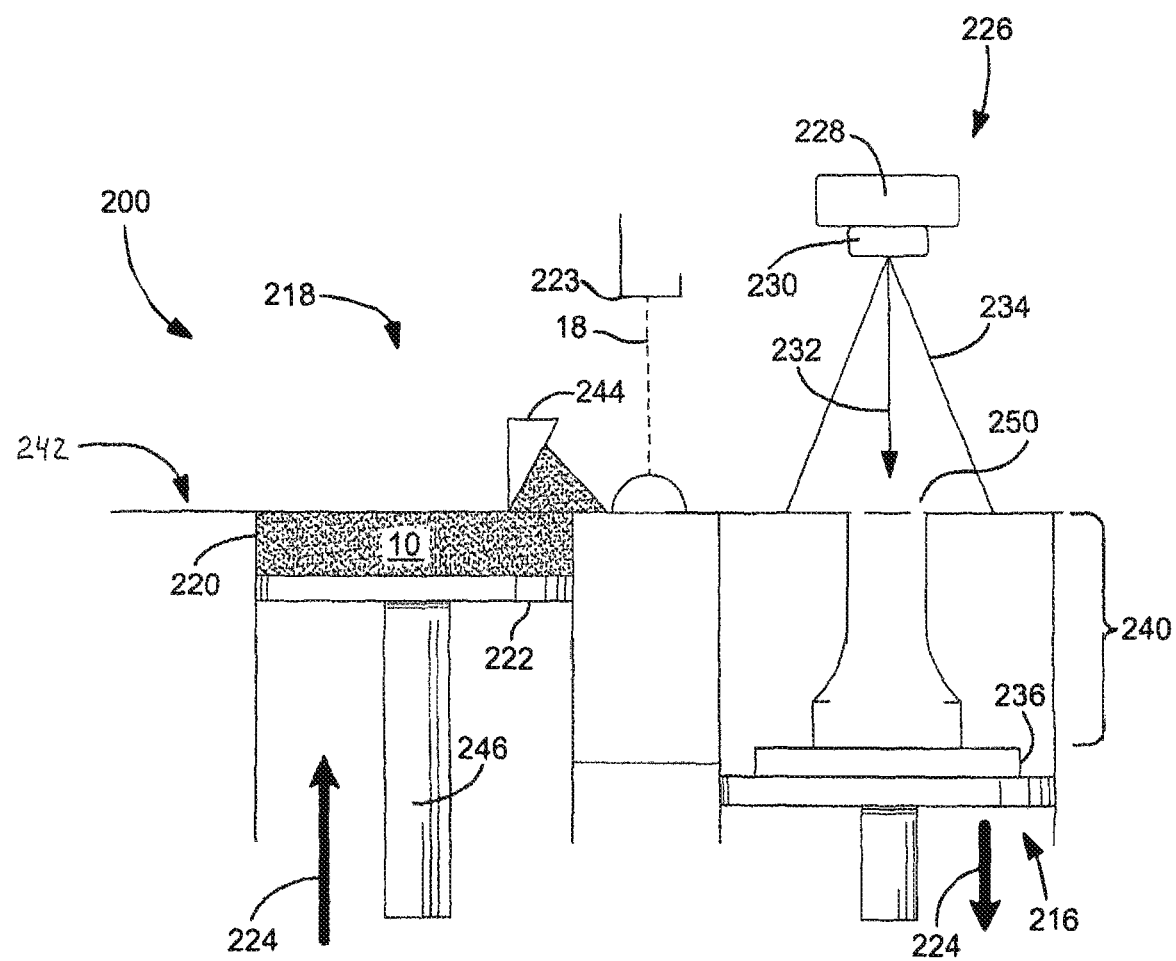
FIG. 3 is a schematic representation of an exemplary additive manufacturing apparatus for employing the powder feedstock.

FIG. 3 schematically illustrates operation of additive manufacturing apparatus 200 to form at least part of a bulk material, and in which the modified particles are incorporated to make the bulk material feedstock. FIG. 3 shows only one non-limiting example of a powder bed type additive manufacturing process and apparatus, and is not meant to limit the described subject matter to a single process or machine Embodiments of apparatus 200 utilize various additive manufacturing processes, such as but not limited to direct metal laser sintering (DMLS) manufacturing or Selective Laser Sintering (SLS) manufacturing, direct laser melting (DLM) manufacturing, selective laser melting (SLM) manufacturing, laser engineering net shaping (LENS) manufacturing, electron beam melting (EBM) manufacturing, direct metal deposition (DMD) manufacturing, and others known in the art. Build table 210 includes movable build platform 216, which can be any object which is capable of being mounted to additive manufacturing apparatus 200 for building one or more near-net shape components. Powder delivery system 218 is capable of supplying successive quantities of metal powder to build platform 216. In this example, powder delivery system 218 includes powder compartment 220 with powder elevator platform 222 disposed proximate to, and movable opposite build platform 216. Build arrows 224 indicate that powder elevator platform 222 is movable in a first vertical direction, and build platform 216 is movable in a second vertical direction opposite the first vertical direction. However, it will be appreciated that other powder supply arrangements can be used such as those where the metal powder is injected into an energy beam before it reaches the intended working surface(s).

In the example shown in FIG. 3, operation of apparatus 200 can begin with providing metallic first powder material 10 to a working surface (e.g., movable build platform 216) of additive manufacturing apparatus 200. Second powder material 18 can be added to the working surface as well via powder injector 223 or other suitable device for combining first and second powder materials 10, 18 proximate build platform 216.

FIG. 3 shows a non-limiting example of energy beam apparatus 226 with beam generator 228 and outlet lens 230 adapted to steer energy beam 232 generally along beam path 234 toward build platform 216. This example is simplified for brevity, and it will therefore be understood that other more complex electron or laser beam configurations (e.g., steering mirrors, prisms, and/or multi-axis CNC systems) can be incorporated to operate other embodiments of energy beam apparatus 226.

The combined powder materials 10, 18 include interior portions 20 of the metallic first powder coated with outer surface layers 26 (shown in FIG. 1). In an additive manufacturing environment. However, it will be appreciated that, in certain embodiments, a first (typically low power) pass can be made with energy beam apparatus 226, prior to a higher power pass used to consolidate first and second powders 10, 18 into modified powder 22 (as shown in FIG. 1).

As noted above with respect to FIGS. 1 and 2, first and second powder materials 10, 18 can alternatively be combined into modified powder 22 prior to their provision to the working surface. In this case, modified powder 22, which may be produced by a fluidized bed process, is provided directly to powder compartment 220 in place of first powder material 10 and subsequently moved over onto build table 216. As such, the steps of combining the particles and adding energy can be performed by the incorporated fluidized bed apparatus rather than additive manufacturing apparatus 200.

FIG. 3 also shows powder bed build plate 236 disposed on build platform 216 to serve as a substantial portion of an initial working surface for build assembly 240. A plurality of successively deposited powder build layers are provided from powder supply 242 by re-coater 244 to build assembly 240. Each powder build layer can then be converted into successively formed component build layers according to a computer model, which can be stored in an STL memory file or other electronic data file accessible by a controller (not shown) of additive manufacturing apparatus 200. Selective areas of each successive deposited layer can be sintered or otherwise adhered to the preceding layer by energy beam 232. After each successive layer, re-coater 244 is returned to a starting position near elevator platform 222, while supply piston 246 advances upward to expose another layer from powder supply 242, while build platform 216 indexes down by approximately one layer thickness. The process is repeated until build assembly 240 is complete with one or more near-net shape components built in a layer-wise manner. Generally, each successive iteration of first and second deposition surface(s) comprise at least a portion of a preceding build layer 250. There may be some overhang and discontinuities, depending on the final build requirements and the capabilities of the build apparatus.

In an exemplary embodiment a 6xxx series aluminum system can include the primary alloying additions of Mg and Si. In this system, Si has the lowest reflectivity and the lowest ignition hazard. Structuring the powder such that the particles have an outer surface that is Si rich will enable safer handling of powder and allow the powder to absorb more energy from the laser source. When this structured powder is melted during the additive build, the Si will dissolve into the melt pool and become well mixed as solidification occurs. The end result is a deposited layer made from the structured powder whose chemistry is no different from a layer made using unstructured alloy powder.

The alloy constituent selected to be enriched on the powder particle surface/outer layer can be in the form of either a continuous or discontinuous coating.

A continuous coating or shell can be achieved using a fluidized bed reactor approach while fixed bed systems will result in partial coverage. Two viable modifications to a fixed bed style coating reactor to improve coverage are to outfit the bed with a vibration module whereby "shaking" of the powder particles will allow them to randomly rotate thus exposing fresh particle surface during the deposition to promote coating coverage and to configure the reactor so that it can rotate and gently tumble the powder particles to promote exposure of fresh particle surface.

The approach to ameliorate one or more of the feedstock challenges detailed above includes structuring the powder such that the outer most surface layer is comprised of an element or compound that has low flammability, low reflectivity, and is less prone to moisture/contamination pick up. This outer layer is one of the constituents of a base alloy and upon melting it becomes well mixed within the melt pool and subsequent solidified microstructure. A specific example to illustrate this concept is provided using aluminum alloys however the approach is general in nature and applicable a variety of other alloy systems.

Powder bulk material feedstock structured according to the disclosed approach will have one or more of the following benefits compared to untreated powder:

1. Reduced reflectivity—by reducing reflectivity, the powder is able to absorb more energy from the laser. The result is that the additive system can melt the powder at lower power for energy/cost savings or the system can scan the laser at faster speeds to reduce build times.

2. Reduced flammability—by coating powder particles with a shell at the outer layer that has a lower ignition/explosion hazard, handling of the powder will be made safer. Overall, the likelihood of damage to personnel and laboratory equipment will be reduced.

3. Reduced contamination—this approach can inert the surface of the powder feedstock making it less sensitive to the pick-up of moisture and other contaminants. The end effect here is that the powder will have a longer shelf life and be able to be reused/recycled thus providing cost savings by minimizing feedstock waste.

A coating applied using the present disclosure provides an effective barrier for preventing re-adsorption of moisture onto the powder. As a result, the coated powder can be stored in a typical production environment for an extended period of time without adverse moisture adsorption.

Additive manufacturing is attractive for expensive aerospace components due to its ability to create complex near net shape parts with limited material waste. This concept offers a way to modify additive feedstock powders to improve build efficiency and part quality.

There has been provided a structured powder particles for feedstock improvement of laser based additive manufacturing. While the structured powder particles for feedstock improvement of laser based additive manufacturing has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A process comprising:
  providing a metallic first powder having a plurality of first particles;
  adding a second material to the first powder, the second material having a plurality of second particles;
  coating the first powder with the second material to form a modified powder including modified powder particles having an interior portion containing an interior composition, and an outer surface portion with an outer composition different from the interior composition;
  wherein said outer surface portion comprises a continuous coating;
  melting said modified powder during an additive build, dissolving said outer composition into a melt pool; and
  mixing said outer composition into said interior composition.

2. The process according to claim 1, further comprising:
  forming an additional layer over said second material after adding said second material and before the coating step of claim 1, said additional layer having a composition different from the interior composition.

3. The process according to claim 2, wherein said interior portion containing the interior composition is a major constituent of an end alloy formed after said additive build and utilized in a near-net shape component.

\* \* \* \* \*